Jan. 28, 1936. H. J. WOODALL Re. 19,840

LAMINATED PANEL AND FABRICATION

Original Filed Jan. 11, 1932

INVENTOR.
Herbert J. Woodall
BY Parker & Burton
ATTORNEYS.

Reissued Jan. 28, 1936

Re. 19,840

UNITED STATES PATENT OFFICE 19,840

LAMINATED PANEL AND FABRICATION

Herbert J. Woodall, Detroit, Mich., assignor to Woodall Industries Incorporated, Detroit, Mich., a corporation of Michigan Original No. 1,945,717, dated February 6, 1934, Serial No. 585,899, January 11, 1932. Application for reissue June 10, 1935, Serial No. 25,846

11 Claims. (Cl. 296—70)

Figure 3:
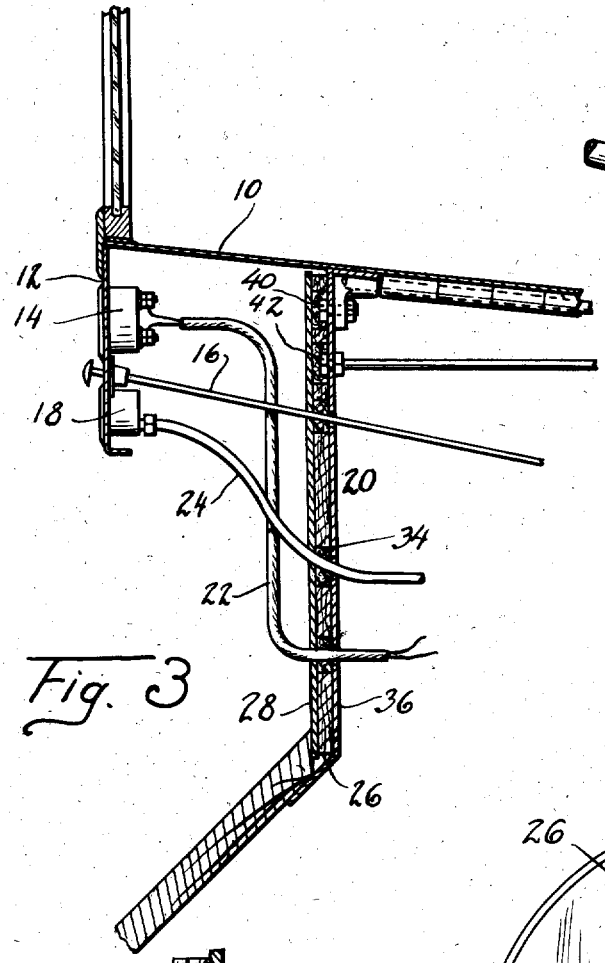

This invention relates to laminated panels and the fabrication thereof, having particular reference to panels adapted for use in automobile bodies and specifically those providing sound deadening characteristics.

A primary object of the invention is to eliminate to as great an extent as is possible the setting up of vibrations either in the panel itself or in adjacent air columns, the result of such vibrations being an unpleasant drumming sound which is quite undesirable.

Another object of the invention is to so form and construct a laminated panel composed of a plurality of plies which make up a composite rigid panel and through which a plurality of control elements are adapted to extend that the said control elements do not contact any of the rigid plies of the panel. In this way the transfer of vibratory movement necessarily imparted to certain of the said controls to the panel structure is eliminated. I propose to provide one of said rigid plies with resilient yieldable inserts associated therewith and held in place by the other of said plies, and provided with openings through which the controls are adapted to extend in such manner that the said controls are supported entirely by and contact only the yieldable substance of the insert.

My improved construction comprises an interior lamination of loosely integrated fragile fibrous insulation material arranged between two stiff outer protective laminations and an important feature resides in the provision of resilient yieldable inserts arranged within the thickness of the intermediate lamination between the two outer laminations. These inserts are held in place within the apertures in the interior lamination by the two outer laminations, extending from one outer lamination through the interior lamination to the other outer lamination and are yieldable and resilient.

A further meritorious feature of the above indicated structure resides in the fact that all frictional contact between the edges of the openings provided in the rigid plies of the panel and the controls is eliminated thereby avoiding the possibility of injuring the said controls or scraping the outer ply of the panel to such an extent that its appearance is adversely affected or setting up vibrations in the rigid plies themselves.

Still another object of the invention is to so construct the panel, or the various plies thereof, that the yieldable inserts adapted to cushion the control rods may be readily replaced should occasion arise, at the same time providing a firm seat for the said element.

A meritorious feature of the structure resides in the fact that the openings in the plies and the opening in the yieldable inserts are so arranged that the control elements may extend therethrough at any one of a large number of angles, thereby rendering a single type of panel assembly available for other than a single standard job.

A further meritorious feature of the invention resides in the fact that the cushion inserts may be so associated and placed with reference to the panel as a whole that the heads of the bolts of the supporting frame may be seated therein. In this way transfer of vibration from the vehicle to the panel from this source is eliminated.

Figure 2:
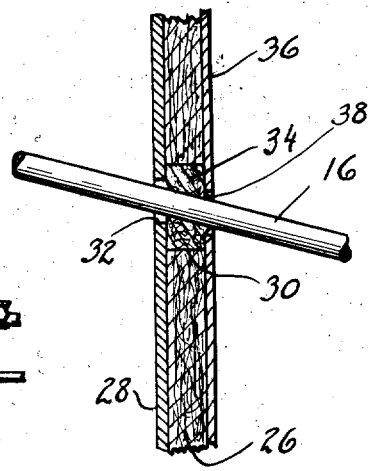
Figure 1:
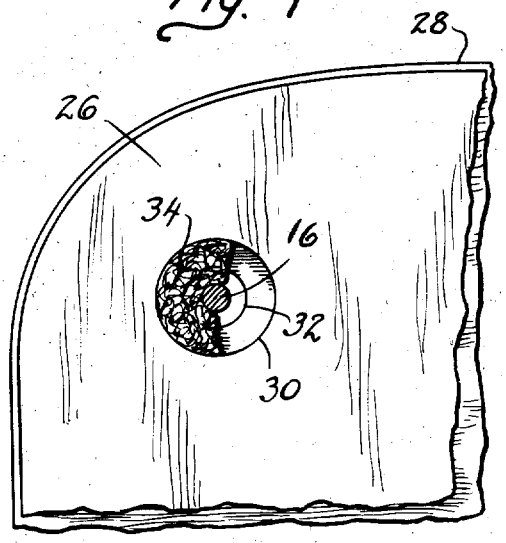
Figure 4:
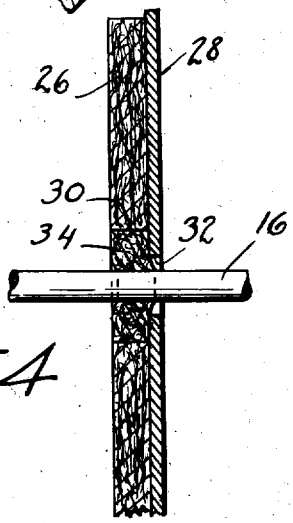

Referring now to the drawing wherein like numerals refer to like parts throughout the several figures and wherein:

Figure 1 is an elevation of a panel illustrating my improved cushion passageway, Fig. 2 is a sectional view of the panel in operative position with relation to the supporting frame, Fig. 3 is a section through the entire panel in operative position, and Fig. 4 is a section through Fig. 1.

Numeral 10 indicates the cowl of any standard vehicle with which is associated the instrument panel 12 wherein a plurality of instruments are positioned. For illustrative purposes an ammeter 14, a choke rod 16 and a speedometer 18, have been shown. The dash panel broadly indicated by numeral 20 is provided with openings as illustrated, each opening being cushioned in a manner to be hereinafter dtscribed more in detail, through which the cable conduit 22, choke rod 16, and speedometer cable 24 extend.

My improved panel is composed of a plurality of rigid plies and is built up in a manner described more in detail in my copending application, Serial No. 538,368, now Patent 1,878,086. One of these plies should be comprised of a loosely integrated fibrous substance which has high heat and sound insulating qualities, a commercial embodiment being known under the trade name Masonite but being substantially incapable of deformation or shaping without rupture, the other ply being of substantially rigid composition yet deformable under heat and pressure and capable of retaining the insulating ply to which it is secured in any form which may be imparted to it by bending, stamping, etc.

In Figs. 1 and 4 a two ply panel of the type briefly described herein has been illustrated, which panel is comprised of a ply of loosely integrated fibrous substance 26 having the insulating qualities hereinbefore described and a substantially rigid ply 28 to which the ply 26 is secured in any suitable manner. While I have illustrated the panel assembly lying within a single plane, it will be understood that the panel is capable of deformation to produce any suitable form in the manner clearly defined in the said copending application.

Each of the plies is provided with an opening. The opening 30 in ply 26 is substantially larger than opening 32 in ply 28. While in Figs. 1 and 4 the openings have been illustrated as circular and positioned in substantially concentric relation to one another, it is understood that such relationship and form are not essential for the purpose desired. It is essential, however, that the openings be in substantial alinement with one another or, to put it in a somewhat different manner, overlap one another. The purpose of such overlapping will become apparent.

In the opening 30, which is the larger and which, in the form illustrated, is provided in the insulating ply 26, is positioned an apertured element 34 composed of any suitable yieldable sound deadening substance such as felt, rubber, etc. The thickness of the element 34 preferably corresponds to that of the ply having the large opening. This yieldable element may be securely positioned within the seat provided by the openings in the adjacent plies, as by means of cement, etc., or may be removably positioned in the seat to permit ready replacement if such replacement should be advisable for any reason. Furthermore, the particular stage of panel construction at which the yieldable element is associated with the assembly is not an essential feature of the invention. It will be apparent that the desired openings may be provided in the plies at the time of their formation and prior to assembling the same, such openings being positioned so that they will lie in overlapping relation when the plies are secured to one another, and the yieldable element 34 may be associated with the insulating ply 26 prior to its association with the form retaining ply 28.

Referring now briefly to the other figures, Fig. 2 is an enlarged sectional illustration of the completed panel assembly with the choke rod 16 extending through an opening provided therefor, the panel being positioned upon a metal support 36 in the customary manner. In this type of structure the composite panel may include a metal ply secured to the side of the insulating ply opposite to the form retaining ply. The metal support 36 may itself constitute such metal ply and may be provided with means for associating the entire triple ply composite panel with the desired portion of the vehicle body interior. This ply is provided with an opening 38 in substantial alinement with or overlapping the openings 30 and 32, as illustrated.

The openings in the outer plies of the composite panel are smaller than the opening in the interior ply 26 whereby a firm seat for the yieldable insert 34 is secured and all possibility of accidental displacement thereof is eliminated.

In the form illustrated in Fig. 3 openings are provided for the cable conduit 22 and the speedometer cable 24 as well as the choke rod 16. It will be apparent that the yieldable inserts associated with each of the openings absorbs the vibration imparted to the controls passing therethrough whereby the transfer of such vibration to the rigid plies of the composite panel itself and the subsequent creation of vibrating air columns to produce unpleasant drumming is eliminated.

Furthermore, particular reference being had to the cable conduit 22 and the speedometer cable 24, it will be apparent that the coverings for these members do not contact the edges of the openings in the rigid plies. Of necessity there must be a certain amount of flexing of each of these control elements in the direction of their length and if contact with the edges of the panel opening were permitted such friction would of necessity tend to destroy the coverings and at the same time roughen the edges of the openings, thereby destroying to some extent the neat appearance of the panel.

It is also to be noted from Fig. 3 that the yieldable insert 34 may be so positioned in relation to the panel assembly as a whole so that the heads 40 and 42 of the panel positioning bolts are embedded and cushioned therein.

All the usual contacts between the panel and various other elements may be cushioned in the manner illustrated and the effectiveness of such cushioning in reducing or substantially eliminating the drumming customarily set up by vibration of such panels constitutes an important forward step in the art and, while certain specific embodiments of the invention have been illustrated herein, the invention is to be limited only within the scope of the appended claims.

What I claim is:

1. In a laminated panel comprising a plurality of plies secured to one another, an opening in an intermediate ply and substantially alined openings of smaller size extending through the remaining plies and a cushion insert disposed within the opening in the intermediate ply and having an opening therethrough alined with but of smaller size than the openings through the remaining plies.

2. In a laminated panel comprising a plurality of plies secured to one another, an opening in an intermediate ply, substantially alined openings of smaller size than that in the intermediate ply extending through the remaining plies, and a yieldable insert having an opening therethrough alined with the openings in the outer plies positioned within the opening in said intermediate ply.

3. A laminated composite rigid panel comprising a rigid layer of fibrous sound deadening material, a layer of form retaining material secured thereto, said layers provided with substantially alined openings but with the opening through the sound deadening layer being substantially larger than the opening through the other layer and a resilient yieldable easily deformable insert seated within the opening through the sound deadening layer and itself provided with an opening registering with the opening through the other layer.

4. A sound insulating laminated panel assembly comprising a plurality of substantially rigid laminations, one of which is a sound insulating lamination, provided with alined openings therethrough, the opening through the insulating lamination being larger than the alined openings through the other laminations, a resilient deformable sound insulating insert seated within the opening through the insulating lamination and held in place by the other laminations and provided with an opening smaller than the openings through said other laminations, and a member extending through said alined openings and held by the insert away from contact with the rigid laminations.

5. A laminated panel comprising two outer plies of relatively dense and rigid material and an inner ply of loosely integrated sound insulating material, said panel provided with an opening through the several plies and wherein the opening through the two outer plies is substantially smaller than the opening through the inner ply, and a resilient sound insulating insert disposed within the opening in the inner ply, said insert being itself provided with an opening aligned with the openings through the two outer plies but of smaller size than said openings.

6. A laminated panel comprising two laminated plies, one being formed of metal and the other being formed of a relatively dense and non-metallic finishing material and an inner ply of insulating material, said plies provided with aligned apertures providing an opening through the panel, the aperture through the two outer plies being of reduced size as compared with the aperture through the inner ply, and a resilient cushion insert positioned within the aperture through the inner ply and having an opening therethrough registering with the opening through the outer plies of a reduced size as compared with at least one of them.

7. A laminated panel structure of the character described comprising a lamination of relatively dense non-insulating material, a lamination of relatively loosely integrated rigid insulating material secured to the first lamination, said two laminations provided with apertures therethrough, the apertures through the second lamination being of substantially larger size than the corresponding apertures through the first lamination, supporting inserts of relatively non-rigid insulating material disposed within the apertures within the second lamination, said inserts having apertures therethrough corresponding with apertures through the first lamination and of reduced size as compared therewith.

8. The invention as defined in claim 2 characterized in that said plurality of plies includes two outer protective plies arranged on opposite sides of the intermediate ply and said intermediate ply is formed of loosely integrated fibrous insulation material.

9. The invention as defined in claim 2 characterized in that said plurality of plies includes two outer protective plies arranged on opposite sides of the intermediate ply and said intermediate ply is formed of loosely integrated fibrous insulation material, and said insert has a thickness substantially equal to the thickness of the intermediate ply, and a metallic element extends through the openings of the two outer plies and through the aligned opening of said insert and is held by said insert from contact with the intermediate ply.

10. A laminated structure comprising two outer plies of protective moisture resistant sheet material and an intermediate ply of loosely integrated fibrous fragile insulation material arranged therebetween and a plurality of resilient inserts arranged within the thickness of the intermediate plies between the two outer plies, said inserts having a thickness substantially equal to the thickness of the intermediate ply and directly contacting at opposite sides the two outer plies.

11. A laminated structure comprising an intermediate lamination of loosely integrated fibrous insulation material arranged between two outer laminations of protective material, said intermediate lamination provided with an aperture therethrough, and a tubular insert of resilient insulation material arranged within the aperture in the intermediate lamination and extending from one outer lamination through the intermediate lamination to the opposite outer lamination, and a member extending through the tubular insert and through said outer laminations and held by the insert against contact with the intermediate lamination.

HERBERT J. WOODALL.